Oct. 27, 1953 — J. W. ALBRITTON — 2,656,601
CUTTING IMPLEMENT
Filed March 31, 1950
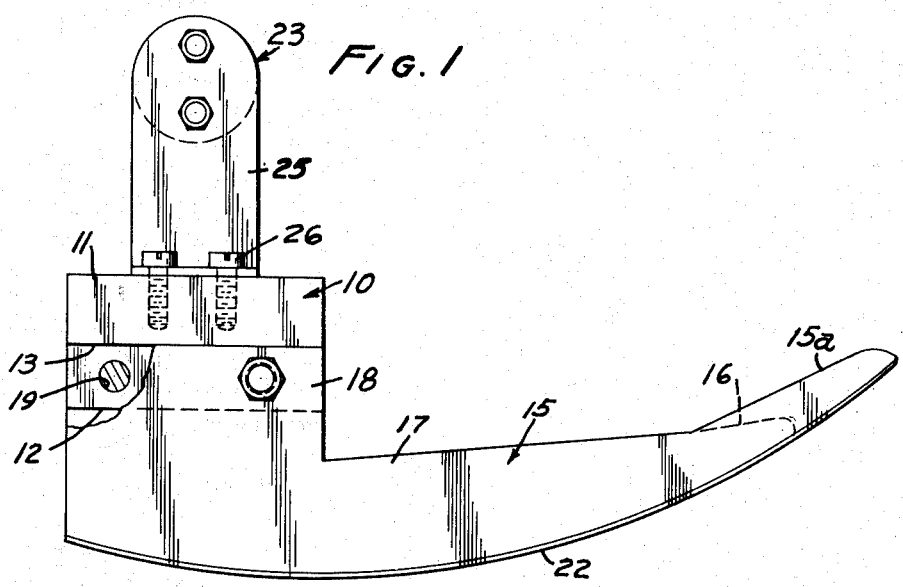
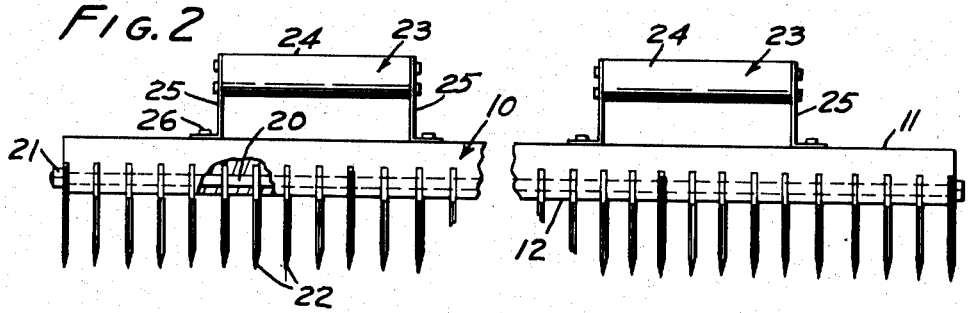
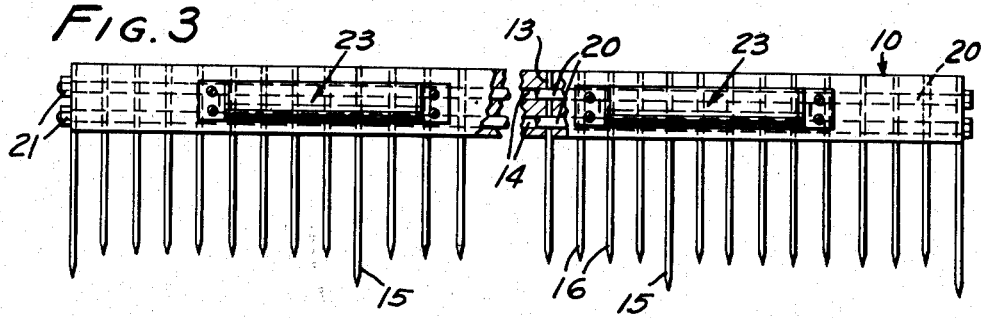
INVENTOR.
JOHN W. ALBRITTON,
BY
Wilfred E. Lawson
ATTORNEY.

Patented Oct. 27, 1953

2,656,601

UNITED STATES PATENT OFFICE 2,656,601

CUTTING IMPLEMENT

John W. Albritton, Pasadena, Calif.

Application March 31, 1950, Serial No. 153,158

1 Claim. (Cl. 30—305)

This invention relates to improvements in cutting implements, and is directed particularly to an improved cutter designed primarily for use by bakers.

An object of the present invention is to provide a novel multi-blade cutter by means of which a long piece or body of dough may be cut into a number of pieces and each of such pieces simultaneously cut or slit part way transversely, in the manufacture of a pastry known as "Bear's Claws," so named because of a remote resemblance to a portion of a bear's foot.

Another object is to provide a novel cutting implement having a plurality of spaced parallel knives having curved or arcuate cutting edges and wherein the blades are arranged in groups divided or identified by blades of greater length and extending beyond the other blades and functioning, in the use of the implement as above described, to cut the length of dough into pieces while the intermediate blades cut such pieces part way across.

A further object is to provide a cutting implement of the character stated, wherein the plurality of blades are mounted and secured in a back body in a novel manner, and said back carries a pair of handles whereby the implement may be easily handled.

Other objects and advantages of the invention will become apparent as the description proceeds and the same will be best understood from a consideration of the following detailed description taken in connection with the accompanying drawing forming a part of the specification, with the understanding, however that the invention is not to be limited to the exact details of construction shown and described since obvious modifications will occur to a person skilled in the art.

In the drawing:

Figure 1 is a view in side elevation of a cutting implement constructed in accordance with the present invention.

Figure 2 is a view in front elevation with portions broken away and in section;

Figure 3 is a top plan view, with portions in section.

Referring to the drawing the numeral 10 generally designates the back body of the implement which is in the form of a length of bar stock, preferably aluminum, and of rectangular cross section, as shown, thereby having the relatively wide top and bottom surfaces 11 and 12 respectively.

The body has cut therein, transversely of the bottom surface 12, the relatively deep slots 13, and formed longitudinally through the body, in horizontally spaced relation are the two bores 14, which pass through the slots 13 and open through the two ends of the body.

The numerals 15 and 16 designate respectively long and short cutting blades. These blades are arranged in spaced parallel relation, the long blades being spaced or positioned at the ends of groups of shorter blades, as shown.

Except for the fact that the blades 15 are longer than the blades 16, they are all alike and except to identify the toe like extension 15a of each long blade, the same reference numerals will be employed to identify the blade parts.

Each blade has a long body 17, which is formed at its rear or back end integral with the flat, upstanding shank 18, which is in the form of a flat plate having a width about the same as that of the body 10, and a thickness to fit snugly in a body slot 13.

Each blade shank also has two suitably spaced holes 19 therethrough to align with the holes 13 in the body and when the blades are all joined to the body, with the shanks inserted in the slots, they are secured in place by the long bolts 20, which extend through the length of the body, in the holes 13, and receive on their ends the nuts 21.

The bottom edges of the blades are curved and sharpened as indicated at 22, and the blades are grouped, so that between each two long blades 15, there will be eight short blades 16.

For ease in handling the implement two handles 23 are secured to the top 11 of the body, each handle comprising the two, long members 24, such as round rod, secured between a pair of L-shaped mounting brackets 25, the latter being secured by suitable machine screws 26, which are threaded into the body.

While the implement may, obviously, be made in any desired size, and it is accordingly understood that any dimensions referred to are not in any respect limiting, a preferred size for the implement would be about twenty-two and a half inches long, with a spacing between the long blades of about four and a half inches, and one-half inch between all blades.

In the use of the implement, a body of dough is formed to have a length greater than the length of the implement and a width considerably less than the length of the short blades.

The dough body is laid out and the implement placed at one side thereof and resting on the heel ends of the blade edges. It is then rocked to bring the toe ends or points of the blades down so that the long blades 15 will cut entirely across the dough body to divide it into a number of pieces, while the short blades 16 will cut only part way across the pieces, each such piece so produced constituting the hereinbefore referred to "Bear's Claws."

The implement may also be used for cutting dough to form other baked articles such as ice box cookies, snails and flat butter horns, and the back of the cutter may be used to totally sever by each blade, a strip of dough, said severed pieces being used for larger coffee cakes, and to make strips for hand twisted or otherwise further treated bakery products.

I claim:

In a cutting implement, an elongated body in the form of a length of bar stock of rectangular cross-section having a plurality of equidistantly spaced slots formed transversely in its lower side and a pair of parallel, horizontally spaced, longitudinal bores passing through the slots and opening through the ends of the body, an elongate cutting blade having an upstanding shank at one end substantially at right angles to the axis of the blade, and snugly fitted in each of the slots, said shank being provided with a pair of apertures in registry with said bores, bolts passing through the bores having nuts at their ends, said blades having their top edges straight for a major portion of the lengths thereof forwardly from said shanks and their bottom edges sharpened and curving forwardly and upwardly throughout their entire lengths, spaced pairs of spaced L-shaped brackets mounted on the top side of the body, and a hand grip member in the form of a length of round rod stock secured to and between each pair of the brackets, certain of said blades being shorter than the others and disposed in sets of an equal number each between the adjacent of the longer blades, one of the longer blades being positioned at each end of the body and said shorter blades being of the same general width as that of the longer blades throughout the major lengths thereof forwardly from their secured ends.

JOHN W. ALBRITTON.

References Cited in the file of this patent

UNITED STATES PATENTS

| Number | Name | Date |
| --- | --- | --- |
| 1,213,681 | Norton | Jan. 23, 1917 |
| 1,457,374 | Lazarus | June 5, 1923 |
| 1,688,283 | Matzelle | Oct. 16, 1928 |
| 1,847,062 | Lemmon, Jr. | Feb. 23, 1932 |
| 1,903,789 | Michaels | Apr. 18, 1933 |